(12) United States Patent
Kim

(10) Patent No.: US 9,693,163 B2
(45) Date of Patent: Jun. 27, 2017

(54) DEVICE AND METHOD FOR CONTROLLING THE POLARITY OF A MICROPHONE OF A TERMINAL DEVICE

(75) Inventor: Chang Ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 792 days.

(21) Appl. No.: 14/116,575

(22) PCT Filed: Aug. 31, 2012

(86) PCT No.: PCT/KR2012/006985
§ 371 (c)(1),
(2), (4) Date: Dec. 16, 2013

(87) PCT Pub. No.: WO2013/032269
PCT Pub. Date: Mar. 7, 2013

(65) Prior Publication Data
US 2014/0091642 A1    Apr. 3, 2014

(30) Foreign Application Priority Data
Aug. 31, 2011    (KR) ........................ 10-2011-0087524

(51) Int. Cl.
*H02H 3/18*    (2006.01)
*H04R 29/00*    (2006.01)
*H04R 1/08*    (2006.01)

(52) U.S. Cl.
CPC ............. *H04R 29/004* (2013.01); *H02H 3/18* (2013.01); *H04R 1/08* (2013.01); *Y10T 307/839* (2015.04)

(58) Field of Classification Search
CPC .. H03F 3/3066; H03F 3/3022; H03F 3/45192; H03F 3/3001; H03F 3/45475;
(Continued)

(56) References Cited

U.S. PATENT DOCUMENTS

| 3,665,330 | A | * | 5/1972 | Tharmaratnam | ... H01L 27/0664 257/551 |
| 3,819,951 | A | * | 6/1974 | Moore | ................ H04M 19/08 327/538 |
| 5,623,550 | A | * | 4/1997 | Killion | ................ H01L 23/642 307/127 |
| 5,661,420 | A | * | 8/1997 | Killion | ................ H01L 23/642 327/29 |
| 2004/0027471 | A1 | * | 2/2004 | Koseki | ................ H04N 5/2173 348/300 |

(Continued)

FOREIGN PATENT DOCUMENTS

| JP | 2010-278691 A | 12/2010 |
| KR | 10-2006-0111950 A | 10/2006 |
| KR | 10-2009-0055359 A | 6/2009 |

*Primary Examiner* — Thienvu Tran
*Assistant Examiner* — Brian K Baxter
(74) *Attorney, Agent, or Firm* — Jefferson IP Law, LLP

(57) ABSTRACT

A device for controlling the polarity of a microphone of a portable terminal includes: a microphone that includes a current control element that is connected between a first polarity terminal and a second polarity terminal; first and second connection terminals that are connected to the first polarity terminal and the second polarity terminal of the microphone; a control unit that detects the level of at least one of the first and second connection terminals and determines whether the polarity of the microphone has been normally connected; a codec that is connected to a first polarity terminal and a second polarity terminal and codes audio signals; and a polarity adjusting unit that is connected between the first and second connection terminals and the first and second polarity terminals of the codec, and switches the outputs of the first and second connection terminals under the control of the control unit in the case of an abnormal connection, so as to be connected to the codec to align polarity.

10 Claims, 4 Drawing Sheets

(58) Field of Classification Search
CPC .......... H03F 3/343; H03F 3/345; H03F 3/347;
H03F 3/45071; H03F 3/45183; H03F
3/45085; H03F 2203/45674; G05F 3/30;
G05F 3/267; G05F 3/22; G05F 3/205;
G05F 3/265; G05F 3/262; H02M 3/073;
H02M 3/07; G11C 5/146; G11C 5/145;
Y02E 60/12; H01R 11/24; H02J 7/008;
H02J 7/0034; H02J 1/10; H02H 3/18;
H02H 11/002; H02H 11/004; H02H
11/003; H04R 1/08; H04R 29/004; Y10T
307/839
USPC .................. 307/127; 330/288, 257; 323/315;
327/535; 320/DIG. 15
See application file for complete search history.

(56) References Cited

U.S. PATENT DOCUMENTS

| | | | |
|---|---|---|---|
| 2004/0051516 A1* | 3/2004 | Yi ......................... | H03F 3/2171 324/133 |
| 2006/0262940 A1* | 11/2006 | Asada .................. | H04R 29/001 381/58 |
| 2009/0175457 A1* | 7/2009 | Nakamura ............. | H04N 5/772 381/17 |
| 2010/0215183 A1 | 8/2010 | Hansson et al. | |
| 2011/0051477 A1* | 3/2011 | Hsu ..................... | H02H 11/002 363/84 |
| 2012/0148060 A1* | 6/2012 | Isberg ................ | G10K 11/1788 381/71.1 |
| 2013/0021046 A1* | 1/2013 | Prentice ............... | H04R 29/004 324/705 |

* cited by examiner

DEVICE AND METHOD FOR CONTROLLING THE POLARITY OF A MICROPHONE OF A TERMINAL DEVICE

TECHNICAL FIELD

The present disclosure relates to a device and method for controlling a microphone of a terminal device, and more particularly, to a device and method that can automatically adjust the polarity of an inserted microphone.

BACKGROUND OF ART

In general, portable terminals such as a mobile terminal, MP3 terminal, and tablet personal computer (PC) have a microphone and perform a function of transmitting and storing an audio signal received through the microphone through a wireless link. However, the microphone has +/− polarity. Therefore, when assembling a portable terminal, a microphone is falsely assembled or when a microphone having opposite polarity is connected to the portable terminal, the microphone cannot be driven. Further, in a handset, a headset, or an ear microphone, because pin allocation corresponding to a microphone is not standardized, a problem that compatibility does not perform exists.

FIG. 1 is a diagram illustrating a configuration of a conventional microphone and a portable terminal connected to the microphone.

Referring to FIG. 1, M+ and M− of the microphone are connected to a terminal 1 and a terminal 2 of the portable terminal through the terminal 1 and the terminal 2, respectively. The terminal 1 of the portable terminal is connected to a power supply terminal VCC through a pull-up resistor 21, the terminal 2 is connected to a ground terminal GND through a pull-down resistor 23, and a codec 25 inputs an output of the terminal 1 and the terminal 2 to MIC+ and MIC− input terminals, respectively. However, as shown in FIG. 1, when the microphone is connected with the polarity opposite to that of a microphone 10, a portable terminal 20 cannot normally control the microphone 10. That is, when M− of the microphone 10 is connected to the terminal 1 of the portable terminal 20 through the terminal 1, and when M+ is connected to the terminal 2 of the portable terminal 20 through the terminal 2, the mobile the terminal 20 cannot normally drive the microphone 10 connected with opposite polarity.

This is because pin allocation corresponding to a microphone is not standardized, as described above. Particularly, in a 4-pole ear microphone, in an American type 4-pole ear microphone, pins are arranged with a left right ground mic, and in an European type 4-pole ear microphone, pins are arranged with a left right mic ground.

Therefore, when pin arrangement of the portable terminal 20 is set in an American type, operation of an European type microphone cannot be controlled, and when pin arrangement of the portable terminal 20 is set in an European type, operation of an American type microphone cannot be controlled. That is, the portable terminal cannot control both European type and American type 4-pole microphones.

DISCLOSURE OF INVENTION

Technical Problem

At present, when a microphone is falsely assembled to opposite in +/− polarity, the microphone does not perform a normal operation, and in a handset, a headset, and an earphone, because pin allocation corresponding to a microphone is not standardized, there is difficulty in compatibility.

The present disclosure has been made in view of the above problems, and provides a device and method that prevent an erroneous operation according to false assembly of a microphone and in which a portable terminal can control operation of the microphone regardless of microphone polarity of a handset, a headset, and an earphone.

Solution to Problem

In accordance with an aspect of the present disclosure, a control device of the polarity of a microphone of a portable terminal includes: a microphone having a current control element connected between a microphone first polarity terminal and a microphone second polarity terminal; first and second connection terminals connected to the first polarity terminal and the second polarity terminal, respectively, of the microphone; a controller that detects a level of at least one connection terminal of the first and second connection terminals and that determines whether the polarity of the microphone is normally connected; codecs that are each connected to the first and second connection terminals to code an audio signal; and a polarity adjusting unit that is connected between the first and second polarity terminals and first and second polarity terminals of the codec and that switches an output of the first connection terminal and the second connection terminal by the control of the controller, when the polarity of the microphone is abnormally connected and that is connected to the codec to align the polarity.

In accordance with another aspect of the present disclosure, a method of controlling the polarity of a microphone of a portable terminal, wherein a polarity control device of a microphone of a portable terminal includes: a microphone having a current control element connected between a microphone first polarity terminal and a microphone second polarity terminal; first and second connection terminals connected to the first polarity terminal and the second polarity terminal, respectively, of the microphone; and codecs that are each connected to the first and second polarity terminals to code an audio signal, the method includes: determining whether the polarity of the microphone is normally connected by detecting a level of at least one of the first connection terminal and the second connection terminal; and adjusting, if the polarity of the microphone is not normally connected, the polarity of the microphone by connecting to the codec by switching an output of the first and second connection terminals.

Advantageous Effects of Invention

It is expected that a false assembly problem of a microphone is removed according to an application of the microphone and a circuit and standardization and compatibility of a product to which the microphone is applied is available. At present, when a microphone is falsely assembled to opposite in +/− polarity, the microphone does not perform a normal operation, and in a handset, a headset, and an earphone, because pin allocation corresponding to the microphone is not standardized, there is difficulty in compatibility. Therefore, in an exemplary embodiment of the present disclosure, a device and method in which an erroneous operation according to false assembly of a microphone is prevented and in which a portable terminal can control operation of the microphone regardless of microphone polarity of a handset, a headset, and an earphone are provided.

MODE FOR THE INVENTION

Hereinafter, exemplary embodiments of the present disclosure are described in detail with reference to the accompanying drawings. The same reference numbers are used throughout the drawings to refer to the same or like parts.

The present disclosure provides a device and method for normally driving a microphone regardless of microphone polarity of an ear microphone, a handset, and a headset connected to the portable terminal or mounted in the portable terminal. Here, a term 'microphone' indicates a microphone mounted in an ear microphone, a handset, and a headset. That is, in an exemplary embodiment of the present disclosure, a microphone mounted in an earphone, a microphone mounted at the inside of a portable terminal (handset), and a microphone mounted in a headset (headphone) are referred to as a microphone. Further, the portable terminal includes a multimedia player such as a mobile phone and an MP3 and a terminal device such as a tablet PC and a laptop computer.

The portable terminal mounts a microphone to receive an audio signal (a user's voice or an audio signal of a periphery of a device) from the outside of the terminal device and may be connected to an external device (earphone, headphone, etc.) having the microphone. In this case, the microphone has the polarity. Therefore, if the polarity between an output terminal of the microphone and an input terminal of the portable terminal does not correspond, the portable terminal cannot normally control the microphone. In the present exemplary embodiment, the portable terminal detects the polarity of the microphone, and in an abnormal case (i.e., a case in which the polarity is opposite), the polarity of the microphone is automatically aligned (adjusted) to correspond with the polarity of the portable terminal.

Hereinafter, M+ and MIC+ are the same signal, and M− and MIC− are used as the same signal.

Figure 1:
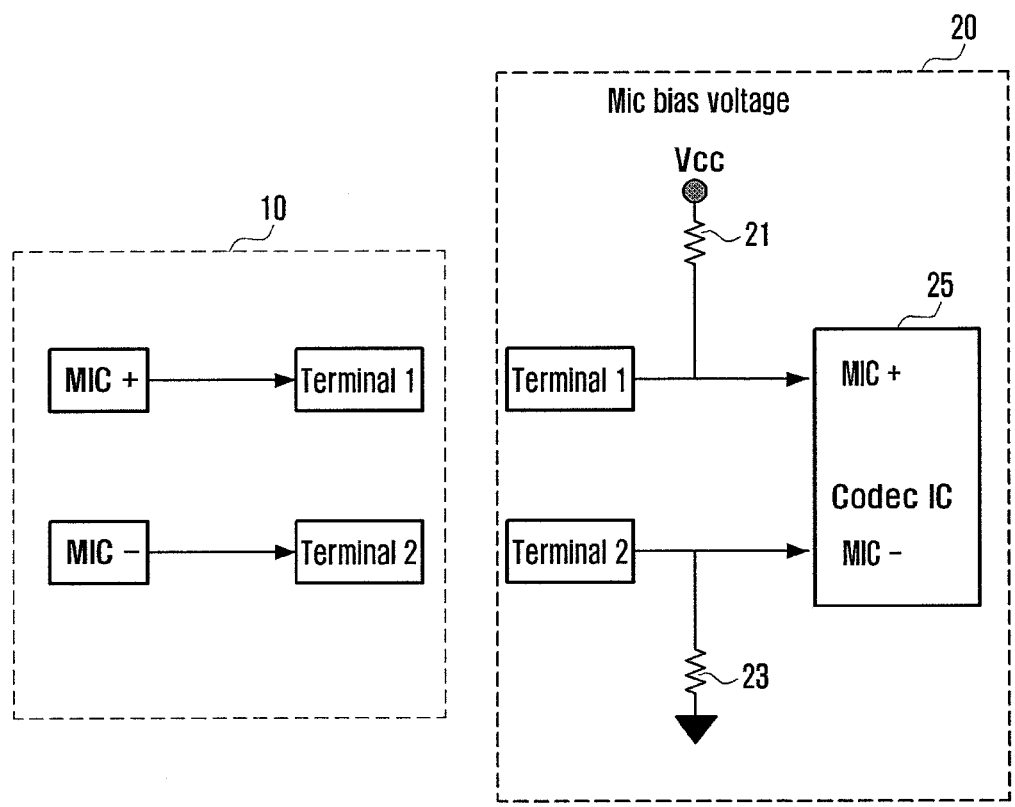
FIG. 1 is a diagram illustrating a configuration of a conventional microphone and a portable terminal connected to the microphone.
Figure 2:
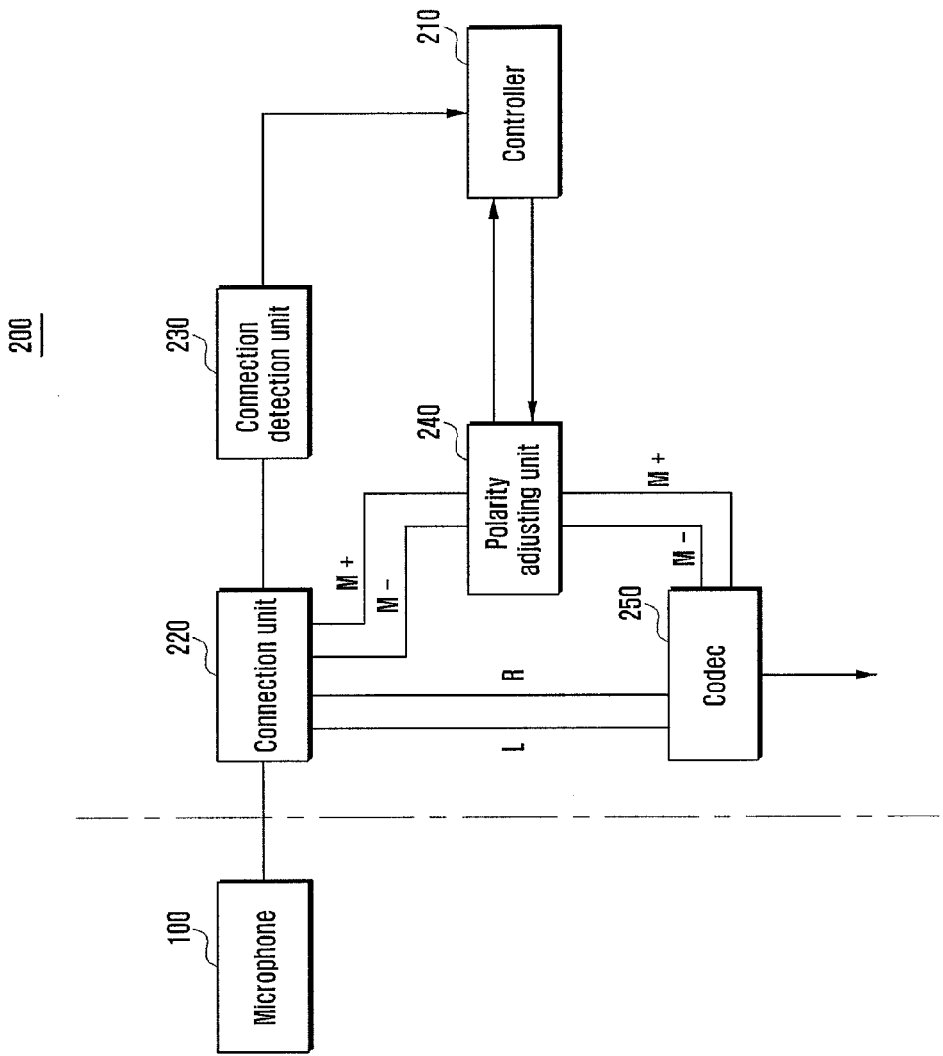
FIG. 2 is a block diagram illustrating a configuration of a portable terminal that automatically aligns the polarity of a microphone and the polarity of the portable terminal by detecting the polarity of the microphone according to an exemplary embodiment of the present disclosure.

FIG. 2 is a block diagram illustrating a configuration of a portable terminal that automatically aligns the polarity of a microphone and the polarity of the portable terminal by detecting the polarity of the microphone according to an exemplary embodiment of the present disclosure.

Referring to FIG. 2, reference number 100 indicates a microphone or an external device in which the microphone is mounted. Hereinafter, reference number 100 is referred to as a microphone. When the microphone 100 is mounted in the portable terminal, a connection unit 220 and a connection detection unit 230 may be omitted. FIG. 2 illustrates a case in which the microphone 100 is mounted in an external device (e.g., an earphone or a headphone), and in this case, the microphone may have a plug. The connection unit 220 of a portable terminal 200 may be a jack. When the plug of the microphone 100 is inserted into the jack, which is the connection unit 220, the connection detection unit 230 detects insertion of the microphone 100 and notifies a controller 210 of this. Further, when the microphone 100 uses a 4-pole terminal, the terminal may be formed with first and second electrode terminals and two audio signal output terminals (here, the audio signal is a stereo signal, and left audio and right audio terminals). Hereinafter, it is assumed that the first electrode is M+ and the second electrode is M−.

First, the microphone 100 connects a current control element between M+, which is the first electrode terminal and M−, which is a second electrode terminal. Here, when the polarity of the microphone 100 and the polarity of the portable terminal 200 (codec) are normally connected, the current control element intercepts a current path from being forming, and when the polarity of the microphone 100 and the polarity of the portable terminal 200 are connected to opposite, the current control element performs a function of controlling a current to flow. Here, the current control element may use a diode.

When a connection of the microphone 100 is detected by the connection detection unit 230, the controller 210 detects the connected polarity of the microphone 100 through a polarity adjusting unit 240, and when the connected polarity of the microphone 100 is opposite, the controller 210 controls the polarity adjusting unit 240 to switch a connection of the microphone 100 and aligns to have the same polarity as that of the portable terminal 200. That is, the polarity adjusting unit 240 has a switch therein, and when a control signal for polarity alignment is input from the controller 210, the polarity adjusting unit 240 performs switching connection so that an M+ terminal and an M− terminal of the microphone 100 have the same polarity as that of an M+ input terminal and an M− input terminal of a codec 250. Therefore, the codec 250 normally processes an audio signal output from the microphone 100.

Figure 3:
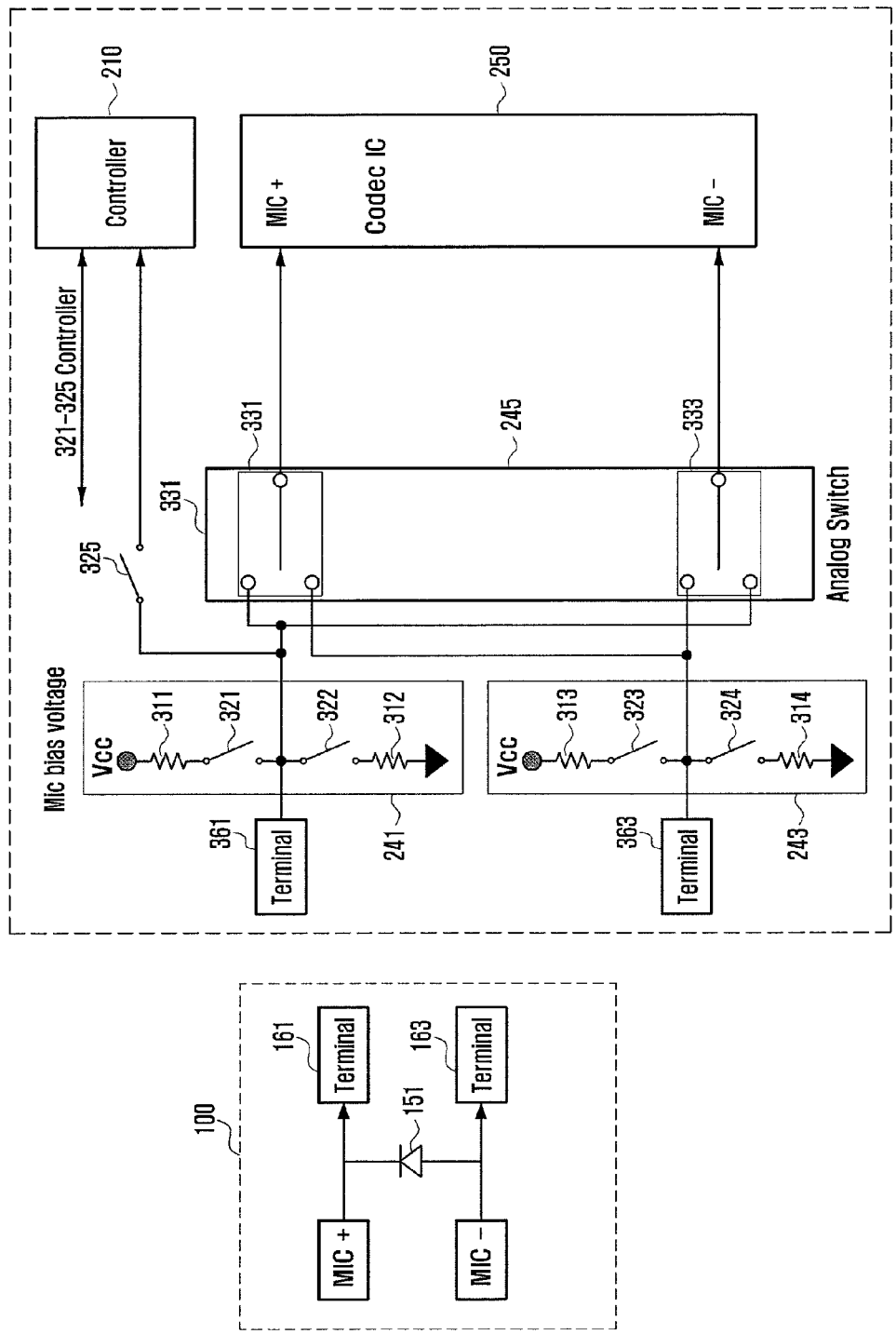
FIG. 3 is a diagram illustrating an example of a polarity adjusting unit that adjusts the polarity of a microphone and the polarity of a portable terminal according to an exemplary embodiment of the present disclosure.

FIG. 3 is a diagram illustrating an example of the polarity adjusting unit 240 that adjusts the polarity of the microphone 100 and the portable terminal 200 according to an exemplary embodiment of the present disclosure.

Referring to FIG. 3, the microphone 100 according to the present exemplary embodiment is connected to a diode 151, which is a current control element for polarity division between the M+ terminal and the M− terminal of the microphone 100, and when the microphone 100 and the portable terminal 200 are connected with opposite polarity, the portable terminal 200 includes the polarity adjusting unit 240 having a switch (analog switch and on/off switch) to adjust the polarity. Hereinafter, it is assumed that the microphone 100 is mounted in an external device like an earphone or a headphone.

When the microphone 100 is inserted into the portable terminal 200, the controller 210 detects insertion of the microphone 100 by the connection detection unit 230, as described above. In this case, an M+ terminal 161 and an M− terminal 163 are connected to a terminal 361 and a terminal 363, respectively, of the portable terminal 200. In this case, by turning on a switch 325 in a default state, the controller 210 detects a level of the microphone 100 applied to the terminal 361. In the default state, the controller 210 turns on a switch 321 and turns off a switch 322 and turns off a switch 323 and turns on a switch 324. In this case, VCC power supplied through a pull-up resistor is supplied to the terminal 361 and a level of the terminal 363 becomes a ground power supply level.

In the above state, when the microphone 100 is inserted, the terminal 161 and the terminal 163 are connected to the terminals 361 and 363, respectively. Therefore, the controller 210 turns on a switch 325 and tests a level of the terminal 361. In this case, when the terminal 161 of the microphone 100 is connected to the M+ terminal, a level of the terminals 161 and 361 becomes the VCC level. In this case, the controller 210 determines that the polarity of the microphone 100 and the polarity of the portable terminal 200 are normally connected. In the present exemplary embodiment, it is assumed that the switch 325 is connected to the terminal 361, but even if the switch 325 is connected to the terminal 363, the same result may be obtained. In this case, when a level of the terminal 363 is a low level (ground power supply level), the controller 210 determines that the polarity of the microphone 100 and the polarity of the portable terminal 200 are normally connected.

If the polarity of the microphone 100 and the polarity of the portable terminal 200 are normally connected, the controller 210 maintains the control of the switches 321-324 of a default state. That is, the controller 210 turns on the switches 321 and 324 and turns off the switches 322 and 323. Further, the controller 210 controls a switch 331 and a switch 333 to connect to the terminals 361 and 363, respectively. Therefore, an M+ signal of the microphone 100 is applied to an M+ terminal of the codec 250 through the terminal 161, the terminal 361, and the switch 331, and an M− signal of the microphone 100 is applied to an M− terminal of the codec 250 through the terminal 163, the terminal 363, and the switch 333. In this case, the microphone 100 is normally connected (polarity of the microphone 100 is normally connected) to the portable terminal 200, and therefore the controller 210 of the portable terminal 200 controls the polarity adjusting unit 240 to a default state and a polarity alignment operation is not performed.

If the polarity of the microphone 100 is connected opposite to that of the portable terminal 200, the controller 210 controls the polarity adjusting unit 240 to align the polarity. As described above, in a default state, the controller 210 turns on the switches 321 and 324 and turns off the switches 322 and 323. When insertion of the microphone 100 is detected, the controller 210 turns on the switch 325 and tests a level of the terminal 361. In this case, the terminal 163 to which an M− signal of the microphone 100 is applied is connected to the terminal 361, and when the terminal 161 to which an M+ signal of the microphone 100 is applied is connected to the terminal 363, i.e., when the polarity is connected to opposite, VCC power supplied to the terminal 361 through a resistor 311 and the switch 321 is applied to the M− terminal of the microphone 100 through the terminals 361 and 163.

Therefore, the terminal 361 becomes a low level and the controller 210 detects this and detects that the polarity of the microphone 100 and the polarity of the portable terminal 200 is connected to opposite. Therefore, the controller 210 turns off the switches 321 and 324 and turns on the switches 322 and 323. Further, the controller 210 controls the analog switches 331 and 333 to connect to the terminals 363 and 361, respectively. Therefore, by turning on the switch 322, a level of the terminal 361 becomes a ground power supply level, and by turning on the switch 323, a level of the terminal 363 becomes a VCC power supply level. Therefore, the M+ signal of the microphone 100 received through the terminal 163 is output to the M+ terminal of the codec 250 through the terminal 363 and the switch 331, and a M− signal of the microphone 100 received through the terminal 161 is output to the M− terminal of the codec 250 through the terminal 361 and the switch 333. Therefore, even if the polarity of the microphone 100 and the polarity of the portable terminal 200 are connected to opposite, the polarity is adjusted and the microphone 100 operates like a normal connection.

Table 1 illustrates operation in which the controller 210 turns on/off the switches 321-324 according to an exemplary embodiment of the present disclosure. In Table 1, in a default state and a normal connection state, it can be seen that the controller 210 turns on the switches 321 and 324 and turns off the switches 322 and 323, in a state in which the polarity is connected to opposite, the controller 210 turns on the switches 321 and 324 and turns off the switches 322 and 323. In this case, it can be seen that the analog switches 331 and 333 are interlocked thereto to be switching controlled.

TABLE 1

|  | Level Detect | SW 321 | SW 322 | SW 323 | SW 324 | SW 325 | Analog Switch |
|---|---|---|---|---|---|---|---|
| Default | High | ON | OFF | OFF | ON | ON | terminal 361-> MIC+ terminal 363-> MIC− |
| Connect MIC terminal 161 to set terminal 361 | High | ON | OFF | OFF | ON | OFF | terminal 361-> MIC+ terminal 363-> MIC− |
| Connect MIC terminal 161 to set terminal 363 | Low | OFF | ON | ON | OFF | OFF | terminal 361-> MIC− terminal 363-> MIC+ |

Further, as described above, when a microphone of an external device is mounted in the portable terminal 200, the polarity is connected to opposite, and operation may be normally controlled. Further, in a microphone 100 mounted at the inside of the portable terminal 200, the polarity may be connected to opposite. That is, when the microphone 100 is assembled at the inside of a set (i.e., the portable terminal), a level of a bias voltage of the set is changed according to the polarity due to the diode 151. In this case, the controller 210 detects a bias voltage level and detects whether + polarity of the microphone 100 is assembled in + polarity of the set or whether − polarity of the microphone 100 is assembled in + polarity of the set, as described above. The controller 210 controls the analog switches 331 and 333 to connect microphone + polarity to a mic+ input of the codec 250 and to connect microphone-polarity to an mic− input according to a detection result (i.e., to correspond to an assembly state of the microphone).

Figure 4:
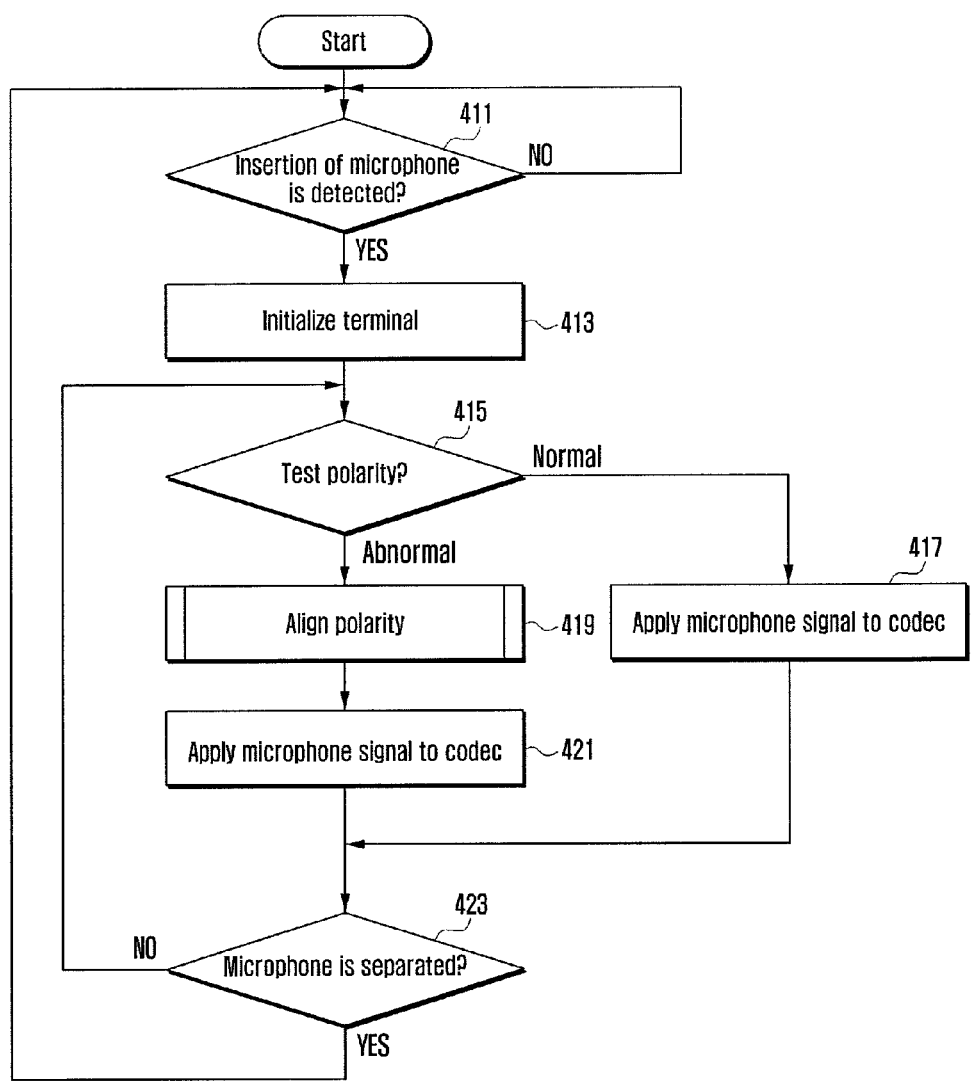
FIG. 4 is a flowchart illustrating a procedure in which a portable terminal adjusts the polarity of a microphone according to an exemplary embodiment of the present disclosure.

FIG. 4 is a flowchart illustrating a procedure in which a portable terminal adjusts the polarity of a microphone according to an exemplary embodiment of the present disclosure.

Referring to FIG. 4, when the microphone 10 is inserted into the portable terminal 200, the controller 210 determines whether insertion of the microphone 100 is detected through the connection detection unit 230 (411).

The controller 210 initializes a connection of switches (413). In this case, the switches 321 and 324 are turned on and the switches 322 and 323 are turned off, and the analog switches 331 and 333 are connected to the terminals 361 and 363, respectively.

The controller 210 turns on the switch 325 and tests a level of the terminal 361 connected to the microphone 100 (415). In this case, if a level of the terminal 361 is a high level (VCC level), the controller 210 determines that the polarity is normally connected, and if a level of the terminal 361 is a low level, the controller 210 determines that the polarity is connected with opposite polarity (abnormally connected).

If the polarity is normally connected at operation 415, the controller 210 maintains a connection state of the switches 321-324 and the analog switches 331 and 333 in a default state (417). That is, the controller 210 turns on the switches 321 and 324 and turns off the switches 322 and 323. Further, the controller 210 controls the analog switches 331 and 333 to connect to the terminals 361 and 363, respectively. Therefore, an M+ signal of the microphone 100 is applied to an M+ terminal of the codec 250 through the terminal 161, the terminal 361, and the switch 331, and an M– signal of the microphone 100 is applied to an M– terminal of the codec 250 through the terminal 163, the terminal 363, and the switch 333.

If the polarity is abnormally connected at operation 415, the controller 210 controls the polarity adjusting unit 240 to align the polarity (419). At the polarity alignment operation, the controller 210 turns off the switches 321 and 324 and turns on the switches 322 and 323 and controls the analog switches 331 and 333 to connect to the terminals 363 and 361, respectively.

The controller 210 controls an output of the microphone 100 to apply to the codec 250 (421). Therefore, an M+ signal of the microphone 100 received through the terminal 163 is output to the M+ terminal of the codec 250 through the terminal 363 and the switch 331, and an M– signal of the microphone 100 received through the terminal 161 is output to the M+ terminal of the codec 250 through the terminal 361 and the switch 333.

As described above, in a state in which the microphone 100 and the portable terminal 200 are connected and operated, the controller 210 determines whether the microphone 100 is separated from the portable terminal 200 (423).

If the microphone 100 is separated from the portable terminal 200, the controller 210 detects this through the connection detection unit 230, and the process returns to operation 411.

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

The invention claimed is:

1. A polarity control device of a microphone of a portable terminal, the polarity control device comprising:
a microphone having a current control element connected between a microphone first polarity terminal and a microphone second polarity terminal;
first and second connection terminals connected to the first polarity terminal and the second polarity terminal, respectively, of the microphone;
a controller that detects a level of at least one connection terminal of the first and second connection terminals and that determines whether the polarity of the microphone is normally connected;
codecs that are each connected to the first and second connection terminals to code an audio signal; and
a polarity adjusting unit that is connected between the first and second connection terminals and first and second polarity terminals of the codec and that switches an output of the first connection terminal and the second connection terminal by the control of the controller, when the polarity of the microphone is abnormally connected and that is connected to the codec to align the polarity,
wherein the polarity adjusting unit comprises:
a first analog switch having a first terminal connected to the first connection terminal and a second terminal connected to the second connection terminal and an output terminal connected to the first polarity of the codec, and
a second analog switch having a first terminal connected to the second connection terminal and a first terminal connected to the first connection terminal and an output terminal connected to the second polarity terminal of the codec.

2. The polarity control device of claim 1, wherein the polarity adjusting unit further comprises:
a first bias unit comprising first and second switches connected between a first power supply source and a second power supply source, respectively, and the first connection terminal and that supplies first power and second power to the first connection terminal by the first and second switches controlled by the controller; and
a second bias unit comprising third and fourth switches connected between the first power supply source and the second power supply source, respectively, and the second connection terminal and that supplies second power or first power, which is a power source different from the second connection terminal to the second connection terminal by the third and fourth switches controlled by the controller.

3. The polarity control device of claim 2,
wherein the current control element of the microphone is a diode having an anode connected to the second polarity terminal and a cathode connected to the first polarity terminal, and
wherein the first polarity is a microphone-terminal and the second polarity is a microphone-terminal.

4. The polarity control device of claim 3, wherein the microphone is mounted in an external device and is connected to a portable terminal through a plug, and the portable terminal further comprises:
a jack connected to the plug; and
a connection detection unit that detects a connection of the lo microphone, when the plug is inserted into the jack.

5. The polarity control device of claim 4, further comprising:
a fifth switch connected between the first connection terminal and the controller,
wherein the controller turns on the fifth switch, when insertion of the microphone is detected and determines as a normal connection, if a level of the first connection terminal is a high level and determines as an abnormal connection, if a level of the first connection terminal is not a high level.

6. The polarity control device of claim 5, further comprising:
a sixth switch connected between the second connection terminal and the controller,
wherein the controller turns on the sixth switch, when insertion of the microphone is detected and determines as a normal connection, if a level of the second connection terminal is a low level and determines as an abnormal connection, if a level of the second connection terminal is not a low level.

7. A method of controlling the polarity of a microphone of a portable terminal comprising a microphone having a current control element connected between a microphone first polarity terminal and a microphone second polarity terminal first and second connection terminals connected to the first polarity terminal and the second polarity terminal, respectively, of the microphone, and codecs that are each connected to the first and second connection terminals to code an audio signal, a first analog switch having a first terminal connected to the first connection terminal and a second terminal connected to the second connection terminal and an output terminal connected to the first polarity terminal of the codec, and a second analog switch having a first terminal connected to the second connection terminal and a first terminal connected to the first connection terminal and an output terminal connected to the second polarity terminal of the codec, the method comprising:

determining whether the polarity of the microphone is normally connected by detecting a level of at least one of the first connection terminal and the second connection terminal; and
adjusting, if the polarity of the microphone is not normally connected, the polarity of the microphone by connecting to the codec by switching the first analog switch and the second analog switch.

8. The method of claim 7,
wherein the microphone is mounted in an external device and is connected to the portable terminal through a plug, and
wherein the method further comprises detecting a connection of the microphone, when the plug is inserted.

9. The method of claim 8, wherein the connection is determined as a normal connection, if a level of the first connection terminal is a high level, and the connection is determined as an abnormal connection, if a level of the first connection terminal is not a high level, when insertion of the microphone is detected.

10. The method of claim 8, wherein the connection is determined as a normal connection, if a level of the second connection terminal is a low level, and the connection is determined as an abnormal connection, if a level of the second connection terminal is not a low level, when insertion of the microphone is detected.

* * * * *